May 11, 1943.    F. H. VAN NEST    2,319,021
RELIEF VALVE
Filed July 22, 1941

Inventor:
Francis H. Van Nest,
by *Harry E. Dunham*
His Attorney.

Patented May 11, 1943

2,319,021

UNITED STATES PATENT OFFICE 2,319,021

RELIEF VALVE

Francis H. Van Nest, Marblehead, Mass., assignor to General Electric Company, a corporation of New York Application July 22, 1941, Serial No. 403,469

3 Claims. (Cl. 251—146)

The present invention relates to relief valves for relieving fluid under pressure from a system as the pressure therein rises beyond a predetermined value. Difficulties have been experienced heretofore with the ordinary relief valves due to pulsation of pressure as may be caused by a pump, particularly of the gear type, and other causes effecting chattering of the valve, that is, continuous opening and closing thereof. In many instances it is undesirable to cause operation of the valve in case the pressure increase is of very short duration only.

The object of my invention is to provide an improved construction and arrangement of relief valves whereby chattering, that is, continuous opening and closing of the valve due to instantaneous pressure changes in a system may be substantially prevented. This is accomplished in accordance with my invention by the provision of a relief valve in which a movable valve member spring-biased towards a seat formed in a casing defines, together with a portion of the casing, a dashpot for dampening vibration and chattering, as well as overtravel in opening direction of the movable valve member.

For a better understanding of what I believe to be novel and my invention, attention is directed to the following description and the claims appended thereto in connection with the accompanying drawing.

Figure 1:
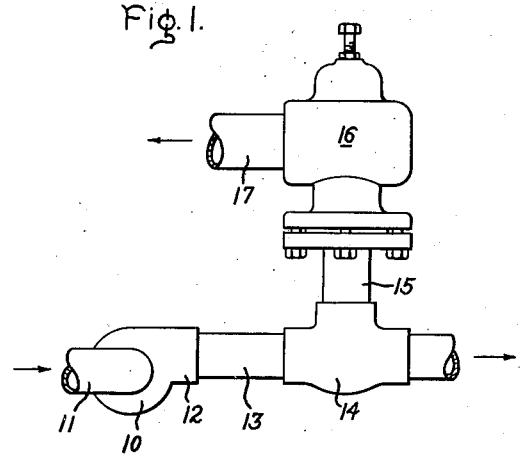
Figure 2:
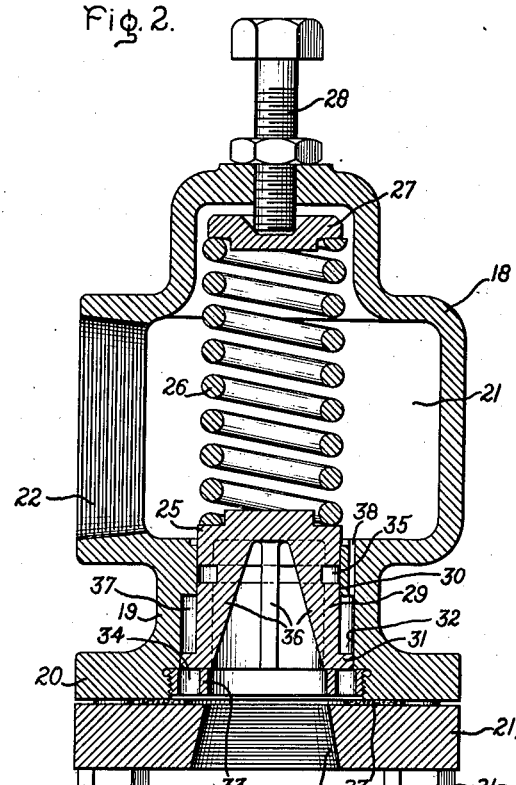

In the drawing Fig. 1 illustrates an arrangement including a relief valve according to my invention; Fig. 2 shows a sectional view of the relief valve used in Fig. 1; and Fig. 3 illustrates a perspective view partly broken away of the movable valve member in Fig. 2.

The arrangement as shown in Fig. 1 comprises a pump 10 having an inlet 11 for receiving fluid, such as oil, and a discharge end 12 connected to a pipe or conduit 13 forming part of a system for conducting oil or like fluid to devices requiring such fluid during operation. In order to relieve the system from excess pressure a T-connector 14 is provided in the conduit 13 and connected by a pipe 15 to a relief valve 16. The relief valve which will be more fully described hereinafter opens upon the occurrence of a predetermined high pressure and discharges some of the fluid from the conduit into a drain conduit 17.

Figure 3:
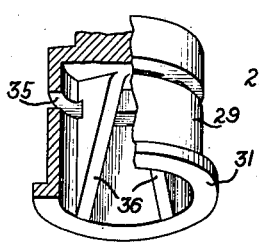

As shown in Figs. 2 and 3, the relief valve has a casing 18 with a lower necked-in portion 19 provided with a flange 20. The casing 18 forms a chamber 21 with an outlet portion 22 for connection to a pipe such as the drain pipe 17 in Fig. 1. The flange 20 is secured to a ring 21b by a plurality of bolts 21a. The ring 21b is sealed to the flange 20 by a packing ring 23 and has a central opening or inlet 24 threaded for connection to a pipe or conduit such as the pipe 15 in Fig. 1. The flow of fluid from the inlet 24 into the chamber 21 is controlled by a movable valve member 25 biased downward by a spring 26 engaging at its lower end the valve member 25 and at its upper end a spring plate 27 held in its position by an adjustable screw 28.

The movable valve member 25 is in the form of a cylinder or hollow piston with an upper portion 29 of small diameter in cooperative relation with and slidably arranged within a small diameter bore 30 formed by the upper part of the necked-in portion 19 of the casing. The piston has a lower portion 31 of larger diameter slidably arranged within a large diameter bore or cylinder 32 formed by the lower part of the necked-in portion 19 of the casing. The piston 25 is retained within the casing and limited in its downward movement by a retainer ring 33 screwed into the flanged portion 20 of the casing and having a plurality of circumferentially spaced axial openings 34. An upper portion of the movable valve member 25 forms a port 35 in the form of an annular groove cut into the hollow cylinder of the valve member 25 and communicating with the interior thereof. The upper and lower parts of the valve member 25 are integrally united by a plurality of interior ribs or webs 36. The movable valve member 25 and the casing 18 form an annular chamber 37 which communicates with the chamber 21 through a small opening 38. During operation the chamber 37 is filled with operating fluid such as oil forced through the conduit 13 and leaking into the chamber 37 through the small clearance formed between the lower large diameter portion 31 of the valve member 25 and the cylindrical wall of the casing. Thus, the chamber 37 constitutes a dashpot defined between the casing and the movable valve member. Upon opening movement of the valve member fluid such as oil contained in the chamber 37 is forced through the opening 38 into the chamber 21. The displacement of fluid from the chamber 37 into the chamber 21 retards opening movement of the valve member 25. Upon closing movement of the valve member 25 fluid enters through the opening 38 and the clearance formed between the lower portion of the valve member and the casing into the chamber 37 and retards rapid closing movement of the valve.

With this arrangement the relief valve remains closed and is prevented from chattering during pulsation of the fluid pressure and also during sudden increases of fluid pressure of short duration only.

From another viewpoint, the relief valve shown in the drawing has a casing forming an inlet chamber and an outlet chamber and a valve member for controlling the communication between the chambers and biased into an end position by a spring normally to disconnect the chamber. In addition, the arrangement includes dashpot means acting upon the valve member to dampen its movement to prevent vibration thereof. In a preferred embodiment the dashpot means are formed by the casing and the valve member. To this end the valve member is of the piston type, more specifically of the differential piston type having a portion with large diameter and another portion with small diameter. The valve member is slidably arranged in a differential cylinder, that is, in a bore formed by the valve casing, which bore has a portion of larger diameter for accommodating the large diameter portion of the valve and another portion with small diameter for accommodating a small diameter portion of the valve. The differential cylinder and the differential piston together define an annular space communicating through a small opening with one of the chambers, preferably the outlet chamber. One portion of the differential piston has a port or ports which in a certain position of the piston establish communication between the inlet and outlet chambers of the valve.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Relief valve comprising a casing member forming an inlet chamber and an outlet chamber and having a portion defining a differential cylinder between the chambers, a differential piston member slidably disposed within the differential cylinder and having a port extending radially through a wall thereof to establish communication between the chambers in the opening position of the piston member, said piston member and cylinder forming an annular space between them, and a bore separate from the main flow of fluid through the casing and of a cross section smaller than that of said port formed in one of the members and constituting the sole connection between said space and one of the chambers to produce a dashpot action between the members during operation.

2. Relief valve having a casing member with an inlet chamber and an outlet chamber, a portion of the casing member forming a differential cylinder, a movable valve member comprising a hollow differential piston member slidably disposed in said differential cylinder and having a port for establishing communication between the inlet and the outlet in the opening position of the piston member, an adjustable spring for biasing the valve member into closing position, the valve member and the casing member forming an annular space between their adjacent faces, and a channel separate from the main flow of fluid through the casing and of a cross section smaller than that of said port formed in one of the members for connecting the space to one of the chambers to keep said space normally substantially filled with operating fluid in order to dampen movement of the piston member.

3. Relief valve comprising a casing having an inlet and an outlet, a portion of the casing between the inlet and the outlet defining a first cylindrical bore near th outlet and a second bore of larger diameter near the inlet and alined with the first-mentioned bore, a valve member comprising a hollow piston slidably projecting through the first bore and an annular flange formed at one end of the piston and slidably disposed within the second bore, the piston having a port extending through a wall thereof and opening into the first bore when the piston is in valve closing position, a retainer ring secured in the casing adjacent said flange and defining an end position for the piston, the flanged piston and the casing forming an annular space between them, said casing having a bore for connecting the space to the outlet chamber.

FRANCIS H. VAN NEST.